(12) United States Patent
Bernardini (10) Patent No.: US 6,301,217 B1
(45) Date of Patent: Oct. 9, 2001

(54) APPARATUS FOR RECORDING OPTICAL DISKS FEATURING INCREASED OPERATING SPEED

(75) Inventor: Bernardino Bernardini, Milan (IT)

(73) Assignee: Bernardini S.r.l., Sesto San Giovanni (IT)

( * ) Notice: Subject to any disclaimer, the term of this patent is extended or adjusted under 35 U.S.C. 154(b) by 0 days.

(21) Appl. No.: 09/334,257

(22) Filed: Jun. 16, 1999

(30) Foreign Application Priority Data

Jun. 18, 1998 (IT) .............................. MI98A1400
May 11, 1999 (IT) .............................. MI99A1023

(51) Int. Cl.[7] .......................... G11B 17/04; G11B 17/08
(52) U.S. Cl. ......................................................... 369/178
(58) Field of Search ................................. 369/178, 191, 369/193, 34; 360/98.04

(56) References Cited

U.S. PATENT DOCUMENTS 5,734,629  3/1998  Lee et al. .............................. 369/34
6,071,344  6/2000  Perego ................................. 118/500

FOREIGN PATENT DOCUMENTS

| 0 554 870 | 8/1993 | (EP) . |
| 0 607 895 | 7/1994 | (EP) . |
| 0725006 A1 | 8/1996 | (EP) . |
| 0 918 324 | 5/1999 | (EP) . |
| 0 919 999 | 6/1999 | (EP) . |

*Primary Examiner*—Robert S. Tupper
*Assistant Examiner*—Julie Anne Watko
(74) *Attorney, Agent, or Firm*—Guido Modiano; Albert Josif; Daniel O'Byrne (57) ABSTRACT

An apparatus for recording optical disks, comprising at least one conveyance means faced by a plurality of recorders for optical disks, one or more means for gripping the optical disks in order to load them and unload them from the recorders, and means for loading the optical disks onto the conveyance means, the loading means being adapted to load the optical disks in a spaced manner on the conveyance means in order to convey them at the recording means.

19 Claims, 7 Drawing Sheets

APPARATUS FOR RECORDING OPTICAL DISKS FEATURING INCREASED OPERATING SPEED

BACKGROUND OF THE INVENTION

The present invention relates to an apparatus for recording optical disks, featuring increased operating speed.

It is known that optical disks and the like, such as compact discs, are recorded by using recording devices which record a single disk at a time after loading said disk by means of a movable arm which places the disk on the pop-out tray of the disk recorder.

These conventional devices, however, have the drawback of a reduced operating speed owing to the need to pick up one disk at a time by means of the mechanical arm and deposit it on the pop-out tray.

The disk pick-up operation performed by the mechanical arm further entails subsequently depositing said disks on the pop-out tray with a pressure which is applied by the mechanical arm to the tray, with the drawback of damaging, in the long term, the mechanism for moving the pop-out tray.

Another drawback is due to the fact that conventional apparatuses have a single disk recorder which is loaded in each instance with the disks to be recorded. This entails a low operating speed of the device and a limited operating performance.

SUMMARY OF THE INVENTION

The aim of the present invention is to provide an apparatus for recording optical disks and the like whose operating speed is much higher than that of conventional apparatuses.

Within the scope of this aim, an object of the present invention is to provide an apparatus for recording optical disks and the like provided with means for the automated loading of the disks in order to record them.

Another object of the present invention is to provide an apparatus for recording optical disks and the like which allows substantially simultaneous recording of a plurality of disks.

Another object of the present invention is to provide an apparatus for recording optical disks and the like which is capable of automatically spacing the optical disks loaded from a magazine and meant to be recorded.

Another object of the present invention is to provide an apparatus for recording optical disks and the like which is highly reliable, relatively easy to manufacture and at competitive costs.

This aim, these objects and others which will become apparent hereinafter are achieved by an apparatus for recording optical disks and the like, characterized in that it comprises at least one conveyance means faced by a plurality of recorders for said optical disks, one or more means for gripping said optical disks in order to load them and unload them from said recorders, and means for loading said optical disks onto said conveyance means, said loading means being adapted to load said optical disks in a spaced manner on said conveyance means in order to convey them at said recording means.

BRIEF DESCRIPTION OF THE DRAWINGS

Further characteristics and advantages of the present invention will become apparent from the following detailed description of a preferred embodiment of the device according to the invention, illustrated only by way of non-limitative example in the accompanying drawings, wherein.

DESCRIPTION OF THE PREFERRED EMBODIMENTS

With reference to the above figures and bearing in mind that in all of the figures identical reference numerals designate identical elements, the recording apparatus according to the invention, generally designated by the reference numeral 1, comprises a supporting frame 2 on which first and second disk transfer means are provided which are designated by the reference numeral 3 and are arranged symmetrically with respect to a central line 4.

The disk transfer means are conveniently constituted by a pair of mutually adjacent belt conveyors which are arranged along the longer side of the frame 2; each conveyor is suitable to support a plurality of optical disks 5 from a loading station to an unloading station.

Each one of the belt conveyors comprises two mutually side-by-side parallel belts 6 and 7 on which the disks 5 are arranged.

A plurality of disk recorders, designated by the reference numeral 8, are stacked and arranged side by side, laterally with respect to the belts 6 and 7 and so that their pop-out trays 9 lie substantially entirely above the belts 6 and 7 when said trays are in the protruding position.

The plurality of disk recorders are arranged, as mentioned, along the longitudinal extension of the belts 6 and 7 and a central turret 10 is provided between the pairs of belts 6 and 7 of each side of the recording apparatus.

The central turret 10 has a plurality of arms 11 whose number is equal to the number of recorders 8 of optical disks 5.

Each mutually opposite pair of arms 11, meant to load the optical disks 5 on the recorders 8, which are also arranged so as to face each other with respect to the centerline 4 of the supporting frame 2, is capable of performing a vertical translatory motion with respect to supporting surfaces of the supporting frame 2, along guides 12, in order to allow the arms 11 to be arranged at the correct height for loading the optical disks 5 and subsequently unloading them from the trays 9 of the recorders 8.

Each arm 11 is provided with grip means 13 which are conveniently constituted by a plurality of fingers which are adapted to open and close, for their insertion in the central hole 15 of the optical disks 5.

In practice, the fingers of the grip means 13 enter the holes 15 in a closed configuration and then open out in order to allow to pick up the optical disks 5 from the belts 6 and 7 or from the trays 9 of recorders 8.

The vertical translatory motion of the arms 11 with respect to the recorders 8 occurs so as to position the arms 11 in each instance at the trays 9 that must be loaded or unloaded with the respective optical disks 5.

Means (loading station) for loading the optical disks 3 onto the belts 6 and 7 of each side of the apparatus, designated by the reference numeral 20, are respectively provided for each side of the apparatus and are constituted by means for locking and releasing said optical disks 5 which are suitable to lock a stack of optical disks, leaving the optical disk at the base of the stack free, so as to allow it to move on the belts 6 and 7 to arrive at the arms 11 and be then picked up by the corresponding arm 11 to be loaded onto the trays 9 of the recorders 8.

The means for locking and releasing the optical disks 5 are constituted by two stacked annular elements 25 and 26; each element is substantially constituted by two partial semicircles 27 and 28 and by a connecting portion 29 which completes the circle when it is inserted between the two semicircles 27 and 28.

The semicircles 27 and 28 and the central portion 29 are pivoted to each other at the points 30 and 31, as shown in the figures, and are engaged on a supporting element 32 provided with slots which are suitable to block the two annular elements 25 and 26 so that one is stacked on top of the other.

Spacing means, conveniently constituted by bearings made of elastic material 32, are provided between one annular element and the other.

Each one of the semicircles 27 and 28 has, at one end, a plate-like element 33 which is meant to allow, when arranged adjacent to the plate-like element 33 of the facing semicircle, to apply an action which mutually spaces the semicircle portions 27 and 28 and an action for closing the semicircles 27 and 28 in order to retain the optical disks 5 between them.

Cam means 34 interposed between the facing plate-like elements 33 are further provided for the actuation of the semicircles 27 and 28 of each one of the annular elements 25 and 26.

The opening and closing movement of the two annular elements is provided asynchronously, i.e., when the annular element 25 opens by means of the action of the cam means 34 the annular element 26 closes and viceversa.

The annular element 26 arranged below the annular element 25 is provided with elastic means 35 which are suitable to push on the edge of the optical disk 5 that is inserted in the annular element 26.

A tubular element 37 is inserted above the annular elements 25 and 26 in order to allow to load the optical disks 5.

Accordingly, the optical disks 5 are loaded, either manually or by means of a mechanical arm or a carousel or any other suitable device, into the tubular element 37 and fall from there into the annular elements 25 and 26.

The alternating action of widening and narrowing the annular elements 25 and 26 allows to make the optical disks 5 descend and at the same time keep them locked in each instance.

The last optical disk 5, i.e., the one that is arranged at the bottom of the stack of optical disks and is therefore substantially ready to be sent onto the conveyor belts 6 and 7, is released by the annular element 26 during its widening, since the annular element 26 clamps all the optical disks 5 except for the last one.

In this manner, one disk at a time is placed onto the conveyor belt 6 and 7, and the disk is spaced from the subsequent disks that are deposited onto the belts 6 and 7 so as to be arranged on the belts at distances which correspond to the distance between the various recorders 8 arranged mutually side by side.

Once a number of optical disks 5 equal to the number of side-by-side recorders 8 has been fed onto the belts 6 and 7 and once the disks have been placed in front of the respective recorders 8, the arms 11 pick up the disks from the belts 6 and 7 and then lift them.

At this point, once the arms have lifted the optical disks, the pop-out trays 9 of the recorders 8 open and the arms deposit the disks onto the trays in order to allow to load the disks into the recorders 8 and record them.

Once the recording operation has ended, the trays 9 of the previously loaded recorders 8 open simultaneously and the arms 11 descend in order to engage again the central holes 15 of the disks 5 so as to lift them from the trays 9 and then deposit them again on the belts 6 and 7 and then carry them to an unloading station located at the end of the belts 6 and 7.

The belts 6 and 7 of each side of the machine are endless and motorized.

The advancement of the belts 6 and 7 is synchronized with the operations for locking and releasing the optical disks by means of the loading means and with the operations for gripping and releasing the optical disks by means of the arms 11.

It is of course possible to provide a single set of optical recorders arranged side by side, with a plurality of stacked recorders, or to have a plurality of superimposed stacks of recorders.

As mentioned, the apparatus according to the invention is characterized in that it preferably provides for the loading of the optical disks and for their recording by means of recorders which face each other in addition to being mutually stacked.

This is nonlimitative, since as mentioned the apparatus can be constituted by at least one stack of recorders 8 arranged mutually side by side along the longitudinal extension of the belts 6 and 7 or by a plurality of recorders 8 arranged simply side by side along the belts 6 and 7 in a single row.

A third embodiment of the means for loading the disks 5 onto the conveyance means 3 and a station for unloading the disks 5 after they have been recorded are shown in FIGS. 6 to 10.

In particular, considering first of all the station for loading the optical disks, said station has an arm 105 which is arranged transversely to the direction of advancement of the conveyance means 3 on which the optical disks 5 are arranged; the length of said arm is such as to affect the entire length of the optical disk recording apparatus.

As shown in the figures, the arm 105 is provided with at least one means for gripping the optical disks, conveniently two means 106 for gripping the optical disks 5, which are arranged so as to slide along the arm 105 from a first inactive position to a second active position and to a third active position which will be described in detail hereinafter.

In particular, the grip means 106 are conveniently constituted by two arms 107 and 108 which are arranged so as to form a sort of crosspiece and can perform a translatory motion along the supporting arm 105.

Conveniently, each arm 107 and 108 supports, at its ends, grip pincers 109 for the optical disks 5 which are constituted by a plurality of finger-like elements which are suitable to open and close in order to allow, when they are closed, insertion in the hole 15 that is normally present in every optical disk 5 and allow, following their opening, to pick up the optical disk 5 and lift it.

The means for gripping the optical disks 5 are provided, in an upward region, with an engagement frame 122 which is meant to allow the engagement of the grip means 106 with the arm 105 and their sliding along the arm.

For this purpose transfer means are provided, conveniently constituted by a motor 123 which is arranged at the end of the arm 105 and is suitable to actuate a belt 124 which is guided around a pulley 125 which constitutes the limit of the stroke of the grip means 106.

The grip or pick-up means are therefore such as to move along the arm 105 from one end of the arm substantially to its central region. This movement is performed in a similar manner by the two grip means 106 arranged along the arm 105.

The arms 107 and 108 of each grip means 106 allow to grip the optical disk by means of the fingers 109 and in particular, because of the arrangement of the arms 107 and 108, it is possible to pick up four optical disks 5 simultaneously, subsequently depositing two optical disks at a time on the conveyance means 3.

The crosspiece formed by the arms 107 and 108 therefore allows to provide faster pick-up of the optical disks from corresponding containers arranged laterally to the conveyance means 3, each of which is designated by the reference numeral 130 and is constituted by a tubular cylindrical element which is internally provided with a respective support 131 on which the optical disks 5 are stacked.

Therefore, as shown in the figures, the optical disks 5 are picked up from the corresponding containers 130 through the movement of the crosspiece 106 along the arm 105 and through the engagement of the fingers 109 in the central holes 15 of the optical disks 5.

This produces the pick-up of the optical disks, four at a time in the example shown in the figure, and the subsequent deposition of the optical disks on the conveyance means 3 as a consequence of a translatory motion of the crosspiece 106 along the arm 105. This translatory motion allows to deposit onto the conveyance means 3 a first pair of optical disks, each arranged so that it is connected to one end of the arms 107 and 108. Once the first pair of optical disks 5 has been deposited onto the conveyance means 3, the crosspiece 106 performs a further step of translatory motion toward the center of the apparatus, allowing the second pair of optical disks 5 to be in turn deposited onto the conveyance means 3, and at this point the crosspiece 106 is free to return at the initial position, i.e., above the containers 130 for stacking the blank optical disks 5 to be picked up and conveyed to the recorders 8 for recording.

The above-described loading station therefore has the considerable advantage of greatly increasing the speed of the operation for picking up the optical disks, since it is possible to pick up a plurality of optical disks simultaneously and to deposit at least two disks 5 at a time onto the conveyance means 3 in order to place the disks at the arms 11 for loading the recorders 8.

Conveniently, the arm 105 is also free to perform a translatory motion along the direction in which the conveyance means 3 move, i.e., along the longitudinal axis of the apparatus.

This allows to move the arm 105 outward with respect to the position for picking up and depositing the optical disks 5 on the conveyance means 3, in order to perform, for example, maintenance operations with ease.

Likewise, the station for unloading the optical disks is provided with an arm 135 which is conceptually fully similar to the arm 105 described above in relation to the station for loading the optical disks onto the conveyance means 3.

Also in this case, the arm 135 is provided with adapted motors 136 which are arranged at the ends of the arm and are suitable to move means for picking up the optical disks 5 during unloading. The pick-up means are conveniently constituted by a pincer assembly 138 which can move along the arm 135, as occurs for the arm 105 of the loading station.

Conveniently, the arm 135 is rigidly coupled to the structure of the apparatus and there are provided a plurality of containers 140 for optical disks 5 recorded by the recording apparatus; the containers are supported by a base element 141 which can perform a translatory motion along a rail 142, so as to move two pairs of containers at a time to a position below the pincer assemblies 138, so that said pincer assemblies can pick up the recorded optical disks arranged at a collection area 145 and move them into a position that lies above the containers 140 and then drop them into the containers.

Conveniently, the containers 140 are constituted by a cylindrical tubular element from whose bottom there protrudes a pointed rod-like element 147 which allows to stack the individual optical disks 5.

Conveniently, the apparatus is provided with an additional area 146 for unloading the optical disks which is arranged downstream of the conveyance means 3 and is suitable to collect incorrectly recorded optical disks.

The optical disks 5 are unloaded from the conveyance means 3 to the collection areas 145 or 146 by means of a chute 148 which allows the optical disks to be positioned in the areas 145 or 146 depending on whether the optical disk is recorded correctly or not.

In detail, the chute 148 allows to convey the optical disks 5 into the collection area 145 meant to collect the correctly recorded optical disks. The area 146 for collecting the incorrectly recorded optical disks is instead connected to the conveyance means 3 by means of a second chute 149 arranged below the chute 148.

The pincer assemblies 138 arranged along the arm 135 of the station for unloading the optical disks are moved, as mentioned, by the motors 136, which drive an endless belt, in a manner similar to the one shown for the loading station arranged upstream of the optical disk recording apparatus.

The movement of the arm 105 in the direction of motion of the conveyance means 3 occurs along a slider 150 which is arranged in an intermediate position between the conveyance means 3 provided for each side of the apparatus.

Accordingly, the arm 105 can perform a translatory motion from a position in which the crosspieces 106 are axially offset with respect to the containers 130 of the optical disks 5 to be picked up to a position in which said crosspieces are arranged exactly above the containers.

The arrangement of the containers 130 of course matches the arrangement of the ends of the arms 107 and 108 that constitute the crosspiece 106, so that said crosspiece can simultaneously pick up the maximum possible number of optical disks 5 from the containers 130.

It is further possible to provide a sort of buffer storage constituted by a supporting surface 160 which is arranged below the recorders 8 so as to accommodate the already-recorded optical disks before repositioning them on the conveyor belt to reach the unloading station.

In practice it has been observed that the apparatus according to the invention fully achieves the intended aim and objects, since it allows to simultaneously record a plurality of optical disks, thus providing a faster recording operation.

Moreover, the optical disks are loaded into the recorders very gently by virtue of the action of the arms provided with openable fingers, differently from what occurs in conventional apparatuses, in which sucker means are provided for picking up the optical disks which apply pressure to the disk and therefore to the tray of the corresponding recorder when the disk is placed thereon.

The apparatus according to the invention therefore allows not only to provide a faster recording operation but also to minimize any damage that might affect the trays of the recorder because they are subjected to the action for depositing the corresponding optical disks to be recorded.

The apparatus thus conceived is susceptible of numerous modifications and variations, all of which are within the scope of the inventive concept.

Figure 1:
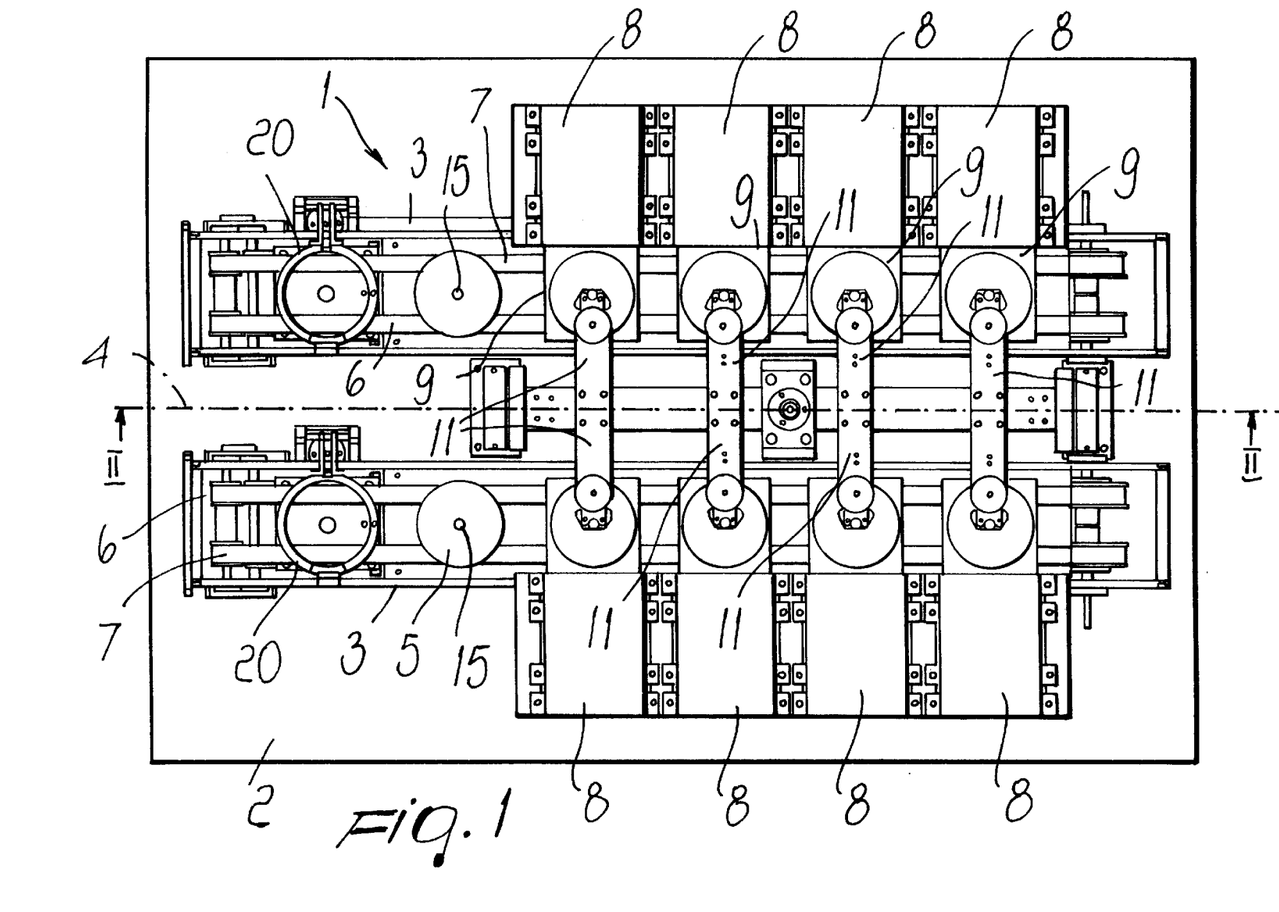
FIG. 1 is a plan view of a first embodiment of the recording apparatus according to the present invention.
Figures 2, 5:
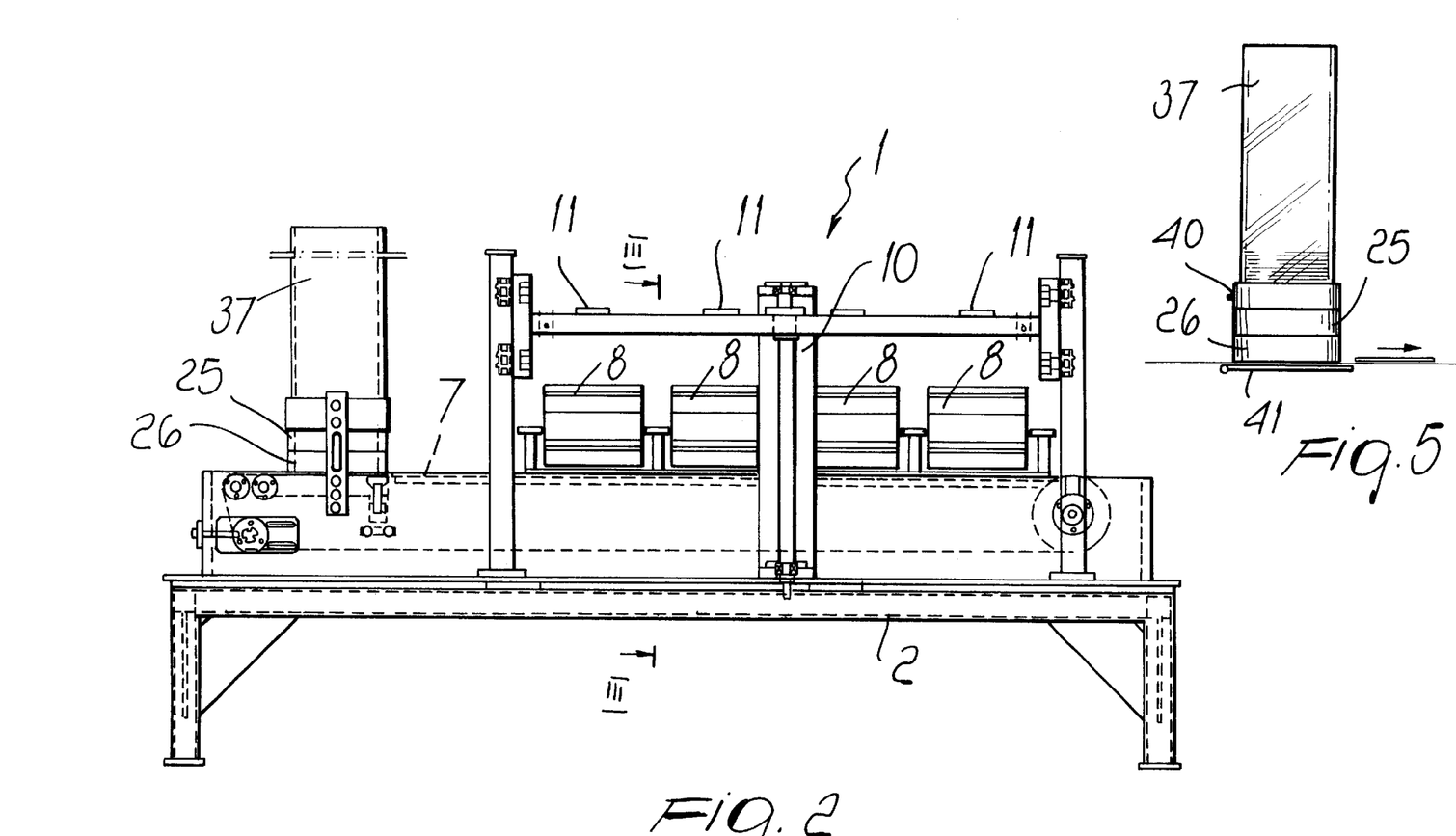
FIG. 2 is a sectional view, taken along the plane II—II of FIG. 1.
FIG. 5 is a schematic view of the means for the automated loading of disks in a second embodiment of the apparatus according to the present invention.
Figure 3:
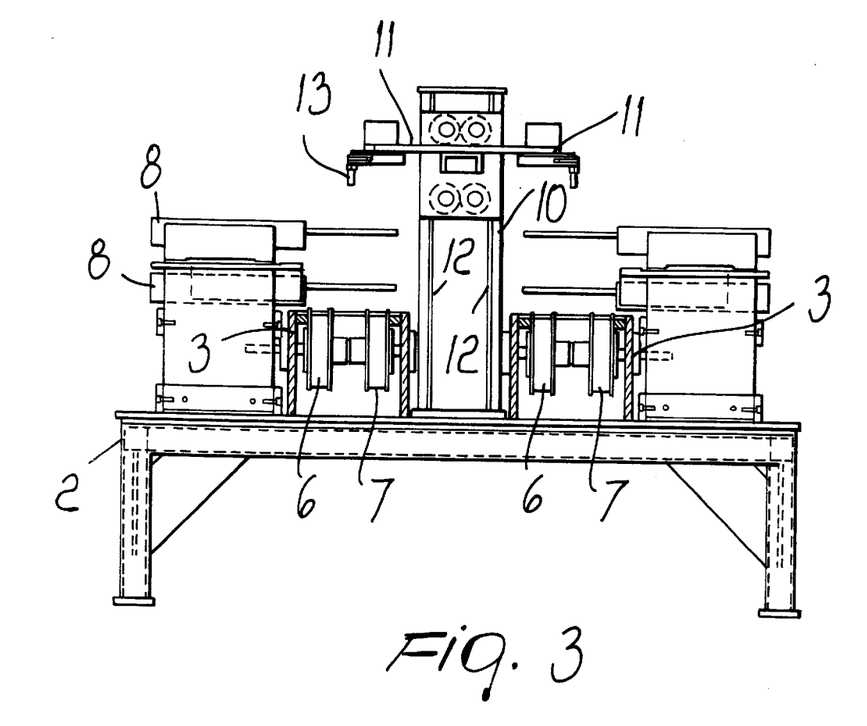
FIG. 3 is a sectional view, taken along the plane III—III of FIG. 2.
Figure 4:
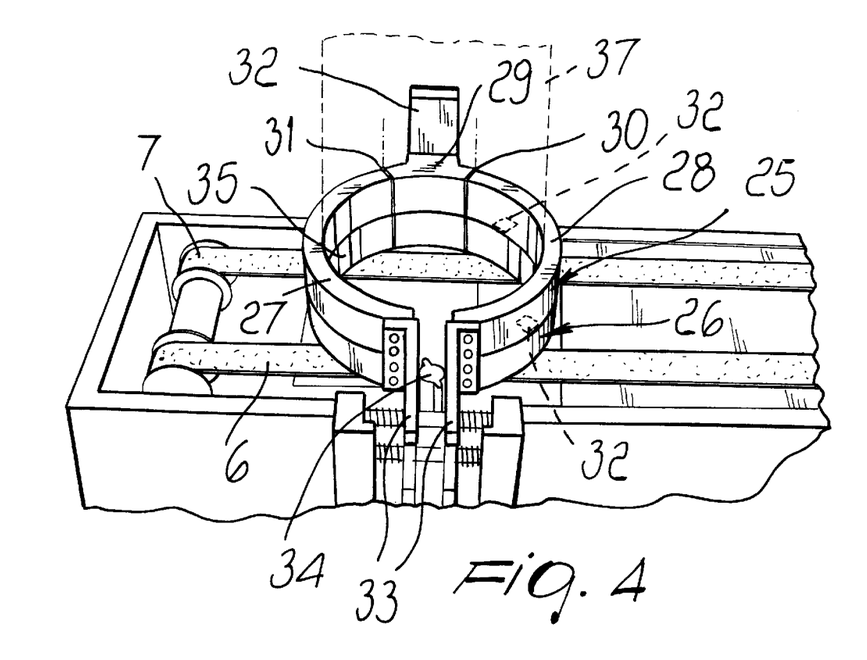
FIG. 4 is a view of the means for the automated loading of disks of the apparatus according to the present invention.
Figure 6:
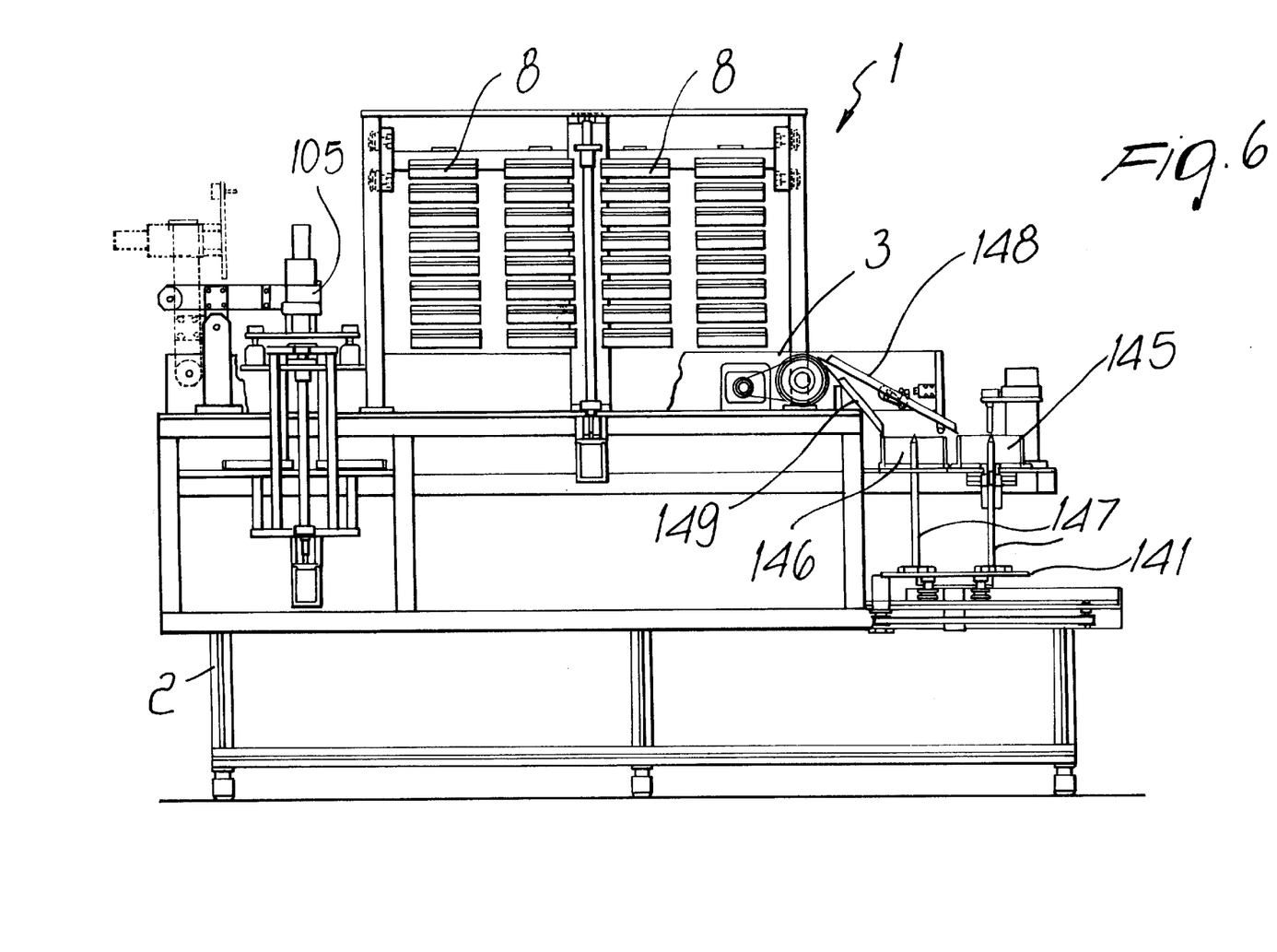
FIG. 6 is a lateral elevation view of the optical disk recording apparatus, to which loading and unloading means are applied according to a third embodiment of the present invention.
Figure 7:
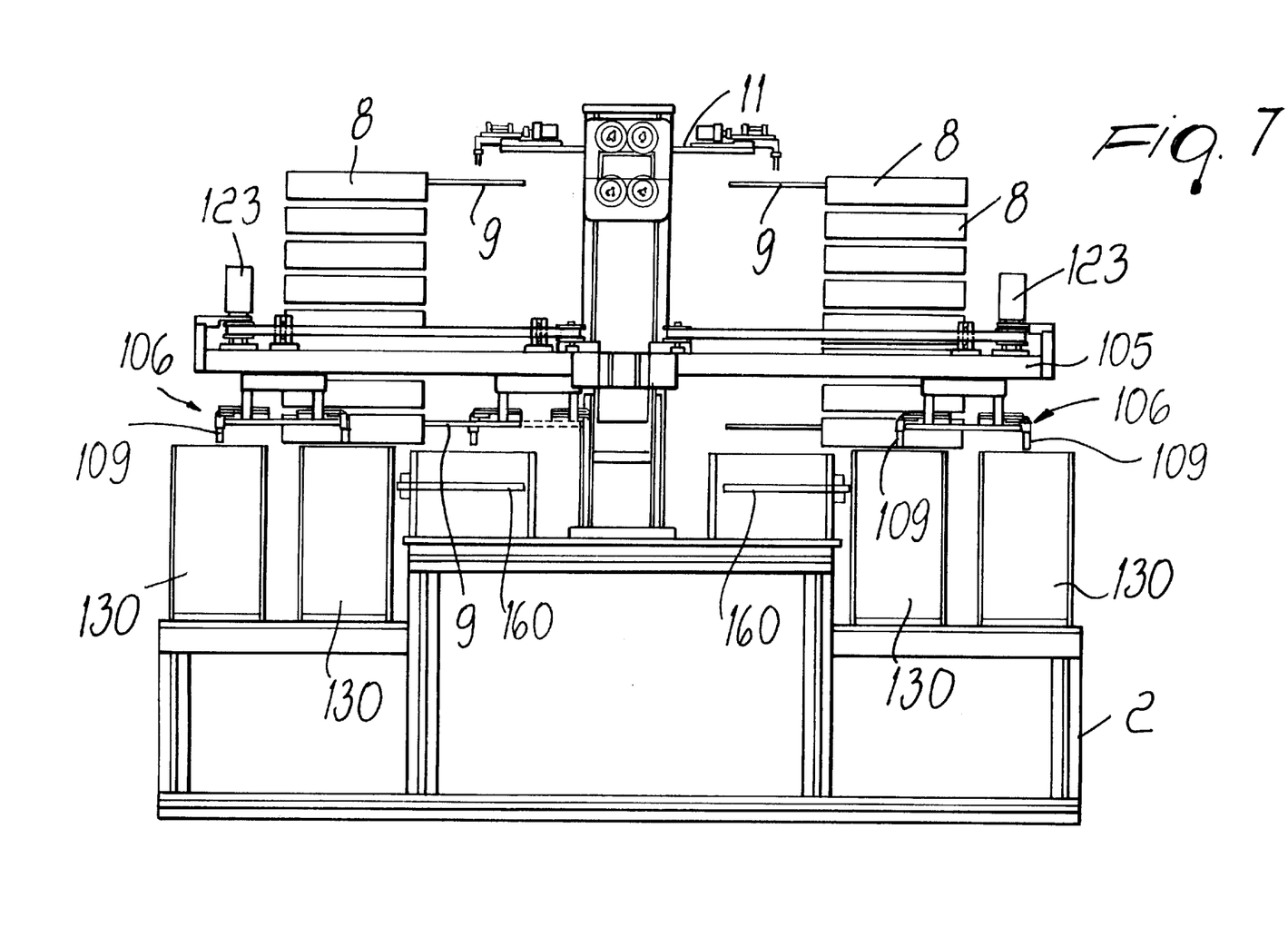
FIG. 7 is a lateral elevation view of the loading means according to the invention of the apparatus of FIG. 6.
Figure 8:
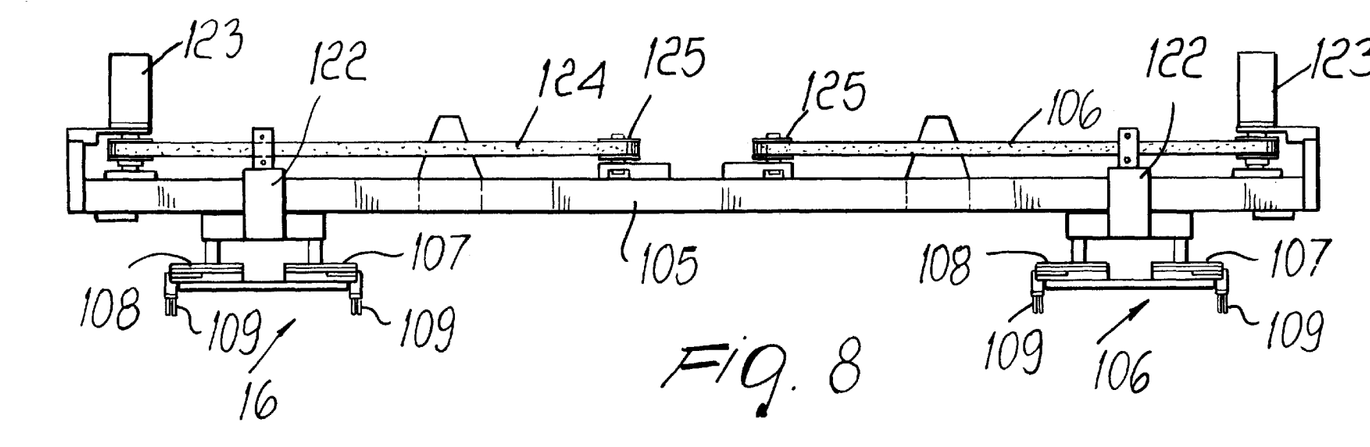
FIG. 8 is a plan view of pick-up means related to the loading means of FIG. 7.
Figure 9:
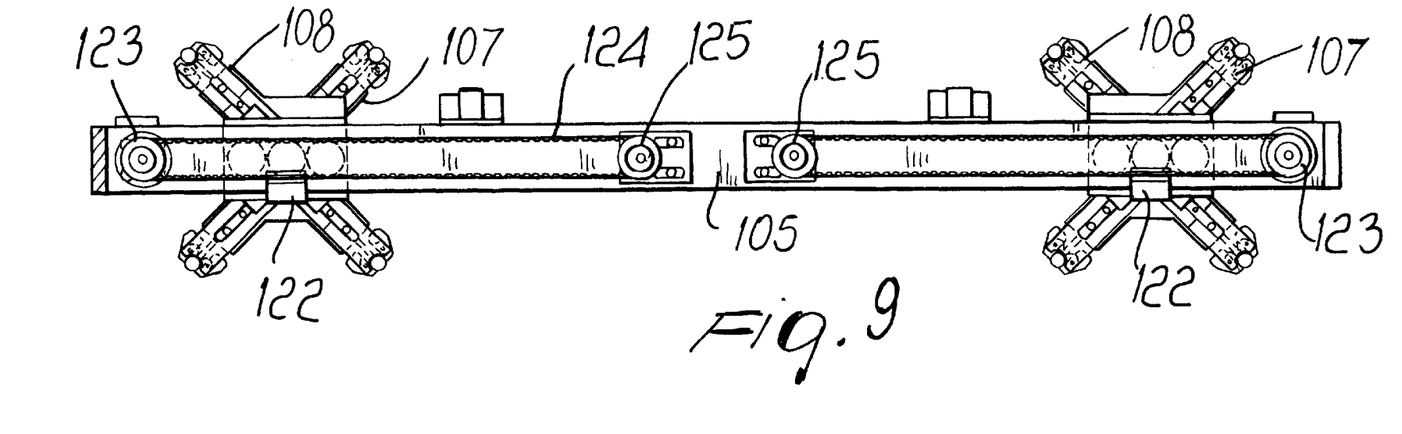
FIG. 9 is a lateral elevation view of the pick-up means of FIG. 8.
Figure 10:
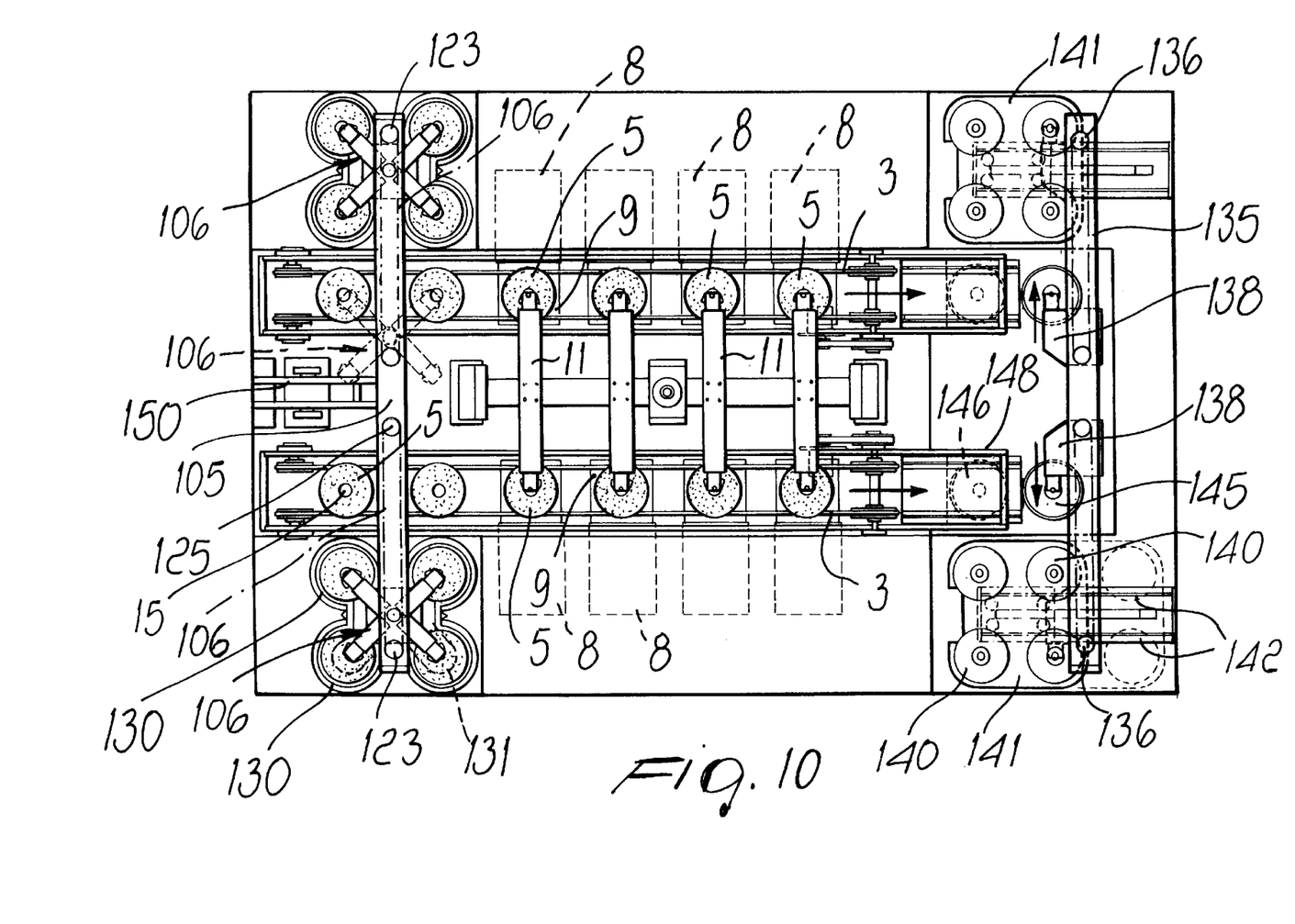
FIG. 10 is a top plan view of the apparatus of FIG. 1, with the loading and unloading means shown in FIG. 65.

Thus, for example, it is possible to provide, in addition to the annular elements 25 and 26, an additional annular element 40 which can perform a vertical oscillating motion with respect to the plane that contains the belts 6 and 7 and can open and close like the annular elements 25 and 26.

In this case, when the annular elements 24; and 26 are closed, the third annular element 40 moves downward and opens. At this point the disks to be recorded descend, the third annular element 40 closes, rising slightly so that the overlying mass of disks does not bear on the underlying mass in order to avoid hindering the exit of the disks.

This operation of the third annular element 40 can occur either every time optical disks leave the first annular element or at periodic intervals that correspond to a certain number of disks.

Below the first annular element 26 there is also a surface 41 which can move so as to release the last optical disk in a downward region, consequently causing it to leave the annular element 26 without sliding against the overlying annular element and the last disk retained by it. The movable surface further allows to eliminate mutual sliding between the optical disk and the belts 6 and 7.

The operating sequence of the second embodiment of the means for loading the optical disks 5 is as follows.

When the movable surface 41 is lowered, the annular elements 1 and 2 are closed.

At this point the movable surface 41 rises and the annular element 26 opens and then closes.

Then the annular element 25 also opens arid closes and a condition is reached in which the two annular elements 1 and 2 are both closed.

At this point the conveyor belts 6 and 7 advance. The annular element 41 acts at the next stop of the conveyor belts, or the above sequence of operations is repeated a preset number of times before the third annular element 41 intervenes.

Finally, all the details may be replaced with other technically equivalent elements.

In practice, the materials employed, so long as they are compatible with the specific use, as well as the dimensions, may be any according to requirements and to the state of the art.

The disclosures in Italian Patent Applications No. MI98A001400 and MI99A001023 from which this application claims priority are incorporated herein by reference.

What is claimed is:

1. An apparatus for recording optical disks, comprising at least one conveyance means faced by a plurality of recorders for optical disks, one or more means for gripping said optical disks in order to load them and unload them from said recorders, and means for loading said optical disks onto said conveyance means, said loading means being suitable to load said optical disks in a spaced manner on said conveyance means in order to convey said optical disks to or from said recorders, wherein said grip means comprise a central turret from which a plurality of arms extend which are arranged mutually opposite in pairs, each one of said arms having, at a free end thereof, engagement means for engaging in central holes of said optical disks.

2. The apparatus according to claim 1, comprising two conveyance means, each of which is composed of two conveyor belts next to which a plurality of stacked recorders are arranged along a longitudinal extension of said conveyor belts.

3. The apparatus according to claim 2, wherein said conveyor belts are motorized and endless.

4. The apparatus according to claim 1, wherein said arms are suitable to perform a vertical translatory motion with respect to said conveyance means in order to load said optical disks onto trays, in extracted position, of said recorders.

5. The apparatus according to claim 1, comprising a supporting frame which is adapted to support said recorders, said conveyance means, said loading means and said central turret provided with arms.

6. The apparatus according to claim 1, wherein said engagement means of said arms comprise a plurality of fingers which are suitable to fit in the central holes of said optical disks and to widen in order to allow to engage and lift said optical disks.

7. The apparatus according to claim 1, wherein said loading means comprise an arm which is meant to be arranged transversely to an advancement direction of optical disks along a recording apparatus and is suitable to support said means for gripping said optical disks which are in turn suitable to move along said arm, said means for gripping passing from a position for picking up said optical disks to a position for depositing said optical disks onto means for conveying said optical disks which are adapted to convey the disks to said recorders in order to record said disks.

8. The apparatus according to claim 7, wherein said means for gripping comprise at least one crosspiece which is constituted by two further arms at whose ends there are provided pick-up fingers for said optical disks.

9. The apparatus according to claim 8, wherein said pick-up means comprise two crosspieces which can move along said arm arranged transversely to the advancement direction of the optical disks along said conveyance means, each one of said crosspieces being actuated by a corresponding motor.

10. The apparatus according to claim 9, wherein said motor of the crosspiece actuates said corresponding crosspiece by means of a belt and a pulley which are arranged in an upward region with respect to said arm along which said crosspiece moves, in an opposite position with respect to said crosspiece, said crosspiece being provided with an engagement and sliding frame for its translators motion along said arm.

11. The apparatus according to claim 8, comprising a plurality of containers for stacking optical disks, said containers being arranged laterally with respect to said optical disk conveyance means and being arranged so as to allow to pick up said optical disks by means of said crosspiece.

12. The apparatus according to claim 11, wherein each one of said stacking containers comprises a tubular element which is internally provided with a support for the stacking of said optical disks.

13. The apparatus according to claim 11, wherein said arm can move along the movement direction of said optical disk conveyance means by sliding along a slider in order to pass from an inactive position, in which said at least one crosspiece is axially offset with respect to said optical disk stacking containers, to an active position, in which said at least one crosspiece is arranged above said stacking containers.

14. The apparatus according to claim 1, further comprising an arm which is arranged transversely to the direction of movement of optical disk conveyance means which supports at least one means for picking up said optical disks from at least one area for unloading said optical disks which is located downstream of said conveyance means, said at least one pick-up means moving along said arm in order to pass from the first position for picking up said optical disks to a second position for unloading said optical disks into unloading containers which are arranged laterally with respect to at least one area for unloading said optical disks.

15. The apparatus according to claim 14, wherein said at least one pick-up means comprises a pincer assembly which is suitable to pick up said optical disks from said at least one unloading area and subsequently convey said optical disks, through the translatory motion of said pincer assembly along said arm, to said containers arranged laterally with respect to said unloading area.

16. The apparatus according to claim 15, wherein said containers for unloading said optical disks are arranged on a common supporting base which is suitable to perform a translatory motion in the direction of the movement of said optical disks along said conveyance means, said base being suitable to move from the first position, in which said pincer assembly picks up said optical disks from at least one of said unloading containers, to a position for picking up said optical disks in which said pincer assembly picks up optical disks from an adjacent container.

17. The apparatus according to claim 14, wherein each one of said containers for unloading said optical disks picked up from said at least one unloading area comprises a tubular element from whose bottom a rod-like element for the stacking of said optical disks protrudes.

18. The apparatus according to claim 14, wherein said at least one area for unloading said optical disks is connected to said conveyance means of the recording apparatus by means of a chute.

19. The apparatus according to claim 18, comprising a second area for unloading said optical disks which is arranged downstream of said conveyance means and is connected to said conveyance means by an additional chute.

* * * * *